United States Patent
Sugimoto

(10) Patent No.: US 8,170,437 B2
(45) Date of Patent: May 1, 2012

(54) OPERATION DISPLAY DEVICE AND IMAGE FORMING APPARATUS EQUIPPED THEREWITH

(75) Inventor: Yasuaki Sugimoto, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 289 days.

(21) Appl. No.: 12/717,008

(22) Filed: Mar. 3, 2010

(65) Prior Publication Data

US 2010/0235775 A1  Sep. 16, 2010

(30) Foreign Application Priority Data

Mar. 13, 2009  (JP) .................. 2009-060652

(51) Int. Cl.
 *G03G 15/00* (2006.01)
(52) U.S. Cl. ............................. 399/81; 399/82
(58) Field of Classification Search .............. 399/81, 399/82, 85
See application file for complete search history.

(56) References Cited

U.S. PATENT DOCUMENTS

| 6,097,506 A | 8/2000 | Eda et al. |
| 2007/0046618 A1 | 3/2007 | Imai |
| 2007/0236721 A1 | 10/2007 | Okamoto |
| 2007/0247642 A1 | 10/2007 | Nakamura et al. |
| 2007/0250733 A1 | 10/2007 | Ezura |
| 2008/0120512 A1 | 5/2008 | Wang |
| 2008/0144070 A1 | 6/2008 | Mori et al. |

FOREIGN PATENT DOCUMENTS

| EP | 1 884 914 | 2/2008 |
| GB | 2 433 612 | 6/2007 |
| JP | 2004-222234 | 5/2004 |
| JP | 2007-148065 | 6/2007 |

OTHER PUBLICATIONS

Japanese Notice of Reasons for Refusal issued by JPO on Nov. 16, 2010, in connection with Appl. No. 2009-060652, 3 pgs.
Corrected translation of Japanese Notice of Reasons for Refusal issued by JPO on Nov. 16, 2010, in connection with Appl. No. 2009-060652, 3 pgs.
European Search Report for appl. No. EP10155557, mailed May 28, 2010, 9 pgs.
Translation of Japanese Notice of Reasons for Refusal issued by JPO on Nov. 16, 2010, in connection with Appl. No. 2009-060652, 3 pgs.

*Primary Examiner* — David Gray
*Assistant Examiner* — Erika J Villaluna
(74) *Attorney, Agent, or Firm* — Squires Sanders (US) LLP

(57) ABSTRACT

When displaying in the energy saving mode, an operation screen having operation buttons related to functions that can be used in the energy saving mode, control is carried out so that the operation buttons related to the functions that can be used in the energy saving mode are displayed in a form that is different from that of the operation buttons related to the functions that can be used only during the normal mode. For example, the operation buttons that can only be used in the normal mode are not displayed in the operation screen of the energy saving mode, or else, the operation buttons that can only be used in the normal mode and the operation buttons that can be used in the energy saving mode are displayed in different colors.

15 Claims, 12 Drawing Sheets

FIG. 2

| POWER SUPPLY MODE | POWER OUTPUT | | | FIXING SECTION | DISPLAY SECTION |
|---|---|---|---|---|---|
| | A | B | C | | |
| OFF MODE | ON | OFF | OFF | OFF | OFF |
| ENERGY SAVING MODE | ON | ON | OFF | OFF | LIMITED DISPLAY |
| NORMAL MODE | ON | ON | ON | START-UP | NORMAL DISPLAY |

| POWER SUPPLY MODE / FUNCTION MODE | AVAILABLE FUNCTION IN ENERGY SAVING MODE | AVAILABLE FUNCTION IN NORMAL MODE |
|---|---|---|
| COPY MODE | HISTORY DISPLAY FUNCTION | * COPY<br>HISTORY DISPLAY FUNCTION |
| SCAN MODE | HDD TWAIN HISTORY DISPLAY FUNCTION | *SCAN TO E-MAIL<br>*SCAN TO SMB<br>*SCAN TO FTP<br>*SCAN TO BOX<br>*TWAIN<br>HDD TWAIN<br>HISTORY DISPLAY FUNCTION |
| FAX MODE | FAX TRANSMISSION-RECEPTION (ACCUMULATION) HISTORY DISPLAY FUNCTION | * FAX TRANSMISSION (INCLUDING SCAN)<br>FAX TRANSMISSION-RECEPTION (ACCUMULATION)<br>HISTORY DISPLAY FUNCTION |
| BOX MODE | BOX TRANSMISSION HISTORY DISPLAY FUNCTION | *BOX PRINT<br>BOX TRANSMISSION<br>HISTORY DISPLAY FUNCTION |
| PC PRINT MODE | HISTORY DISPLAY FUNCTION | *PRINT<br>*SECURE PRINT<br>*USER BOX PRINT<br>*FAX PRINT<br>HISTORY DISPLAY FUNCTION |
| UTILITY MODE | HISTORY DISPLAY FUNCTION | *REPEAT PRINT<br>HISTORY DISPLAY FUNCTION |

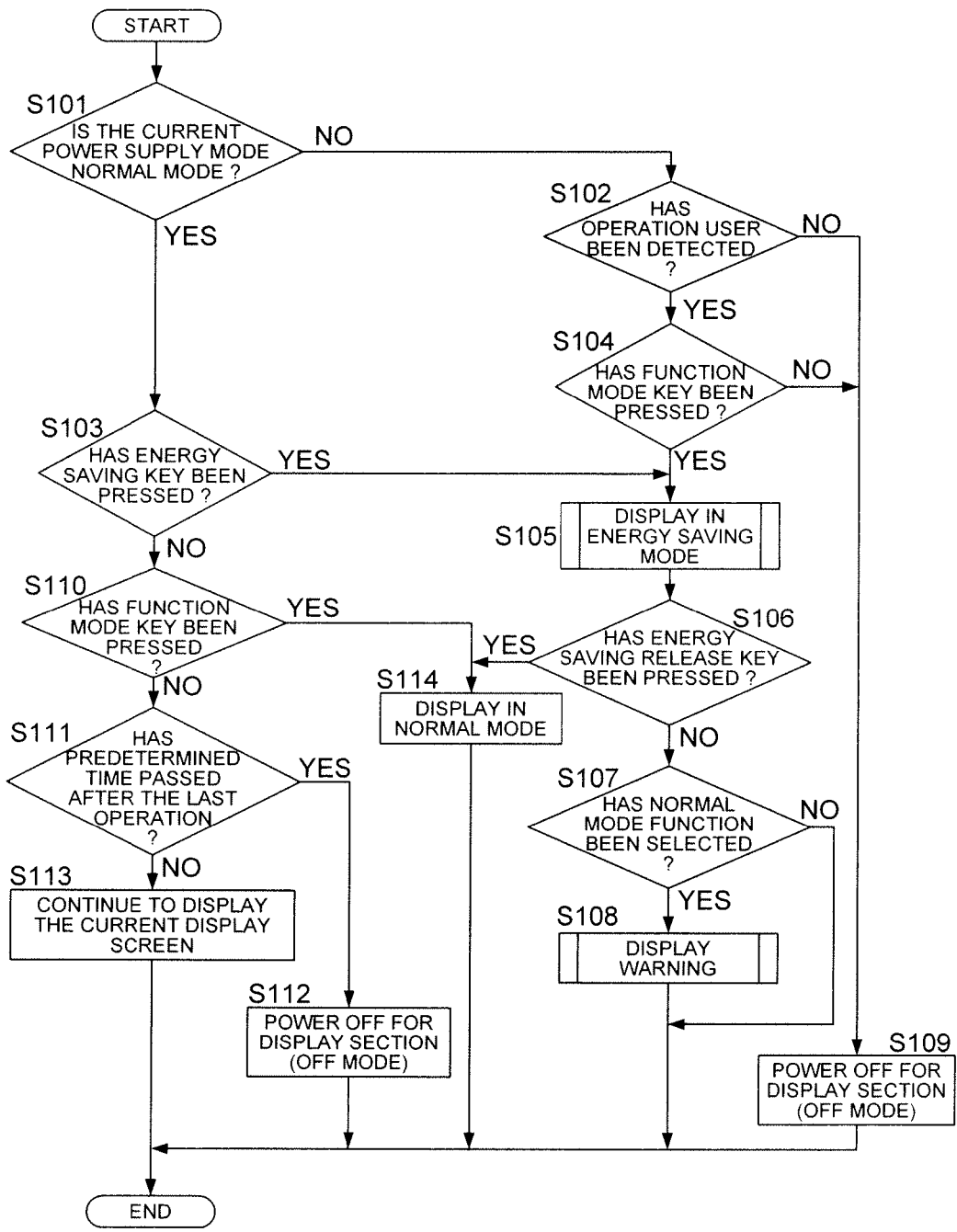

FIG. 11a

FAX MODE

BOX ACCUMULATION TRANSMISSION FUNCTION INPUT HAS BEEN COMPLETED. PRESS START KEY FOR SENDING

| SELECTED BOX | JAPANESE APPLICATION |
| DOCUMENT TO BE SENT | REQUEST FOR DRAFT CREATION |
| DESTINATION | ABC PATENT OFFICE 03-1212-1212 |

RETURN   ENERGY SAVING RELEASE

FIG. 11b

FAX MODE

BOX ACCUMULATION TRANSMISSION FUNCTION

NOW FAX TRANSMISSION STARTS.

AS IN ENERGY SAVING MODE, OPERATION DISPLAY DEVICE IS SET TO NON-DISPLAY

RETURN   ENERGY SAVING RELEASE

OPERATION DISPLAY DEVICE AND IMAGE FORMING APPARATUS EQUIPPED THEREWITH

This application is based on Japanese Patent Application No. 2009-060652 filed on Mar. 13, 2009 with Japanese Patent Office, the entire content of which is hereby incorporated by reference.

BACKGROUND OF THE INVENTION

The present invention relates to an operation display device that carries out display of operation screens and acceptance of operations corresponding to function icons displayed in those operation screens and to image forming apparatuses provided therewith, and in particular to operation display devices provided in apparatuses, the power supply mode of which is switched between a normal mode and an energy saving mode and to image forming apparatuses provided therewith.

From the point of view of energy saving, various types of apparatuses are configured in recent years so that, when a condition with no operations continues for more than a prescribed period of time, the power supply to various parts such as the liquid crystal display is stopped thereby entering the energy saving mode. Normally, in the energy saving mode, power supply is stopped excepting to the parts that detect an event for recovering to the normal mode (for example, a prescribed operation by the user or reception of a facsimile (hereinafter, also referred to as fax) and others), and when an event for recovering is detected, the power supply is restarted to all parts of the apparatus.

However, in an apparatus such as a multifunctional peripheral which is provided with a variety of functions such as copying function, scanning function, facsimile transmission and reception function, the parts that need power to be supplied differ depending on the function used. For example, when carrying out fax transmission of a document that is stored in the memory, there is no need to supply power to the printer section. Therefore, there are apparatuses that aim to reduce power consumption by restarting the power supply at the time of recovering from the energy saving mode only to the parts related to the functions to be used after recovery (see, for example, Japanese Unexamined Patent Application Publication No. 2004-222234). In this apparatus, the recovery from the energy saving mode is not done unless the copy button, document box button, fax button, printer button, or scanner button provided for each function is selected and depressed, and also, the power supply recovery is made only for the part that is required for thus selected function.

While it is effective to restart the power supply only for the part that is related to the function selected by the user, at the time the user selects the function upon recovery, since the user does not know whether that function requires a large power or small power, it is not possible to contribute to energy saving by actively selecting low power consumption functions at the time of recovering from an energy saving mode.

Preferred embodiments of the present invention aim to solve the above problem, and an object is to provide an operation display device in which it is possible to prompt the selection of a low power consumption function at the time of accepting selection of a function in the energy saving state, and an image forming apparatus provided therewith.

SUMMARY

The summaries of some preferred embodiments of the present invention for achieving the above object are as follows.

(A) An operation display device that is provided in an apparatus in which the power supply mode changes between a normal and an energy saving mode in which the power consumption is smaller compared to the normal mode, and that carries out the display of function icons and reception of selection operation among functions corresponding to those function icons, wherein said operation display device has a control section that displays the function icons related to the functions that can be used in said energy saving mode in a form different from the function icons related to the functions that can be used only in said normal mode at the time of displaying in the state of said energy saving mode, a prescribed screen having function icons related to the functions that can be used in said energy saving mode.

(B) An image forming apparatus of the above-mentioned apparatus provided with said operation display device.

In the above preferred embodiments, in a screen that is displayed in the state of the energy saving mode, the function icons corresponding to the functions that can be used in the energy saving mode without changing to the normal mode are displayed in a form different from the form of the function icons corresponding to the functions that cannot be used unless the mode is switched to the normal mode. Because of this, the functions that can be used in the energy saving mode are differentiated from the functions that require changing over to the normal and to make the user recognize this, and it is possible to prompt the user to select functions that can be executed in the energy saving mode before changing over to the normal mode.

BRIEF DESCRIPTION OF THE DRAWINGS

FIG. 2 is an explanatory diagram of the power supply modes used in an image forming apparatus and the power supply locations in each of the power supply modes.

FIG. 3 is an explanatory diagram showing the functions belonging to each of the functional modes of the image forming apparatus while classifying them into functions that can be used in the energy saving mode and the functions that can be used in the normal mode.

FIG. 8 is a flow chart of the processing related to the changing over of the power supply mode and the display of the operation screen.

FIGS. 11a and 11b are front view diagrams showing examples of the display screen before completion and after completion of the setting operations related to the function selected in the energy saving mode.

DETAILED DESCRIPTION OF THE PREFERRED EMBODIMENTS

Figure 1:
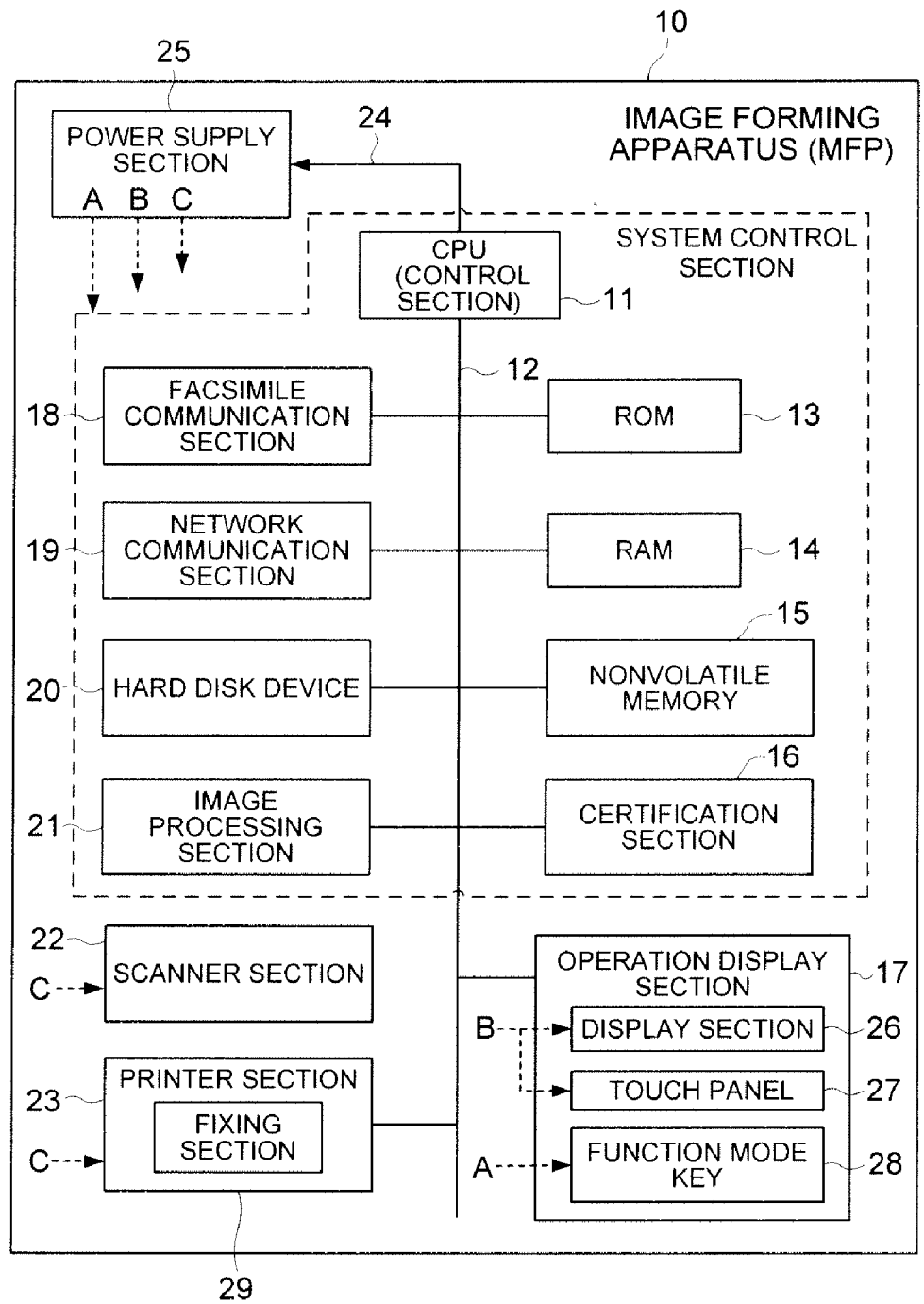
FIG. 1 is a block diagram showing the configuration of an image forming apparatus according to a preferred embodiment of the present invention.

Further preferred embodiments of the present invention are explained below.

[1] An operation display device according to (A) above wherein said apparatus is, further provided additionally with an off mode as a power supply mode in which the power consumption is smaller compared to said energy saving mode, and is configured so that the power supply mode is changed to said energy saving mode when a selection operation is received in said off mode, of the function types of the functions that can be used in said apparatus and that have been classified into a plurality of types, and said control section displays a screen corresponding to the function type that is selected by said selection operation as said prescribed screen that is displayed in said energy saving mode to which the power mode has been changed upon receiving a selection operation of said function types in said off mode.

In the above preferred embodiment, since the functions possessed by the apparatus are broadly classified into a plurality of function types and screens are displayed for each function type, this is suitable when there are many varieties of functions possessed by the apparatus. Further, the trigger for transferring from the off mode to the energy saving mode is the selection operation of a function type, and also, since the screen displayed when transferred to the energy saving mode is made to correspond to the function type, the device display efficiently the screen displaying the function icon related to the function belonging to the function group whose use is desired by the user.

[2] An operation display device described in (A) or [1] above wherein said control section carries out a prescribed warning display when a selection operation is received, in the state of said energy saving mode, of a function corresponding to a function icon related to the functions that can be used only in said normal mode.

In the above preferred embodiment, it is possible to make the user hesitate to execute a function by taking the trouble of transferring to the normal mode thereby suppressing the execution of such functions. In addition, when the selection operation of a function requiring transfer to the normal mode has been made by mistake, it is possible to make the user become aware of the wrong operation by giving a warning before transferring to the normal mode and to make the user take measures such as canceling the selection request.

[3] An operation display device described in (A) or [1] above wherein said control section, when displaying said prescribed screen in the state of said energy saving mode, displays the function icons related to the functions that can be used in said energy saving mode and does not display the function icons related to the functions that can be used only in said normal mode.

In the above preferred embodiment, since the function icons related to the functions that require transferring to the normal mode are not displayed, it is possible to effectively suppressing the act by the user of selecting those functions.

[4] An operation display device described in any one of (A) and [1] to [3] above wherein said function icon carries out the function of an operation button that selects the function corresponding to that function icon.

In the above preferred embodiment, the function icon also has the function of an operation button. For example, the display screen is provided with a touch panel, and the function icon is made into a soft key.

[5] An operation display device described in any one of (A) and [1] to [4] above wherein in said energy saving mode, the display of a screen by that operation display device is made off soon after the operation setting related to the selected function has been completed.

In the above preferred embodiment, in the energy saving mode, when the operation setting related to the selected function has been completed, immediately thereafter, or when a prescribed time period has elapsed after that, the display screen in the operation display device becomes off. By turning off the display early upon the completion of operation setting, still higher energy saving is achieved. Further, when the display screen of the operation display device becomes off due to transferring to the off mode, it is also possible to configure so that the transfer to the off mode is made upon the completion of operation setting.

[6] An operation display device described in any one of (A) and [1] to [4] above wherein in said energy saving mode, upon the completion of execution of the selected function, the display of screens by that operation display device is made off.

In the above preferred embodiment, in the energy saving mode, when the execution of the selection function is completed, immediately thereafter, or when a prescribed time period has elapsed after that, the display screen in the operation display device becomes off. By turning off the display early upon the completion of execution of the function, still higher energy saving is achieved. Further, it is possible to carry out displays related to the execution status of the function. Also, when the display screen of the operation display device becomes off due to transferring to the off mode, it is also possible to configure so that the transfer to the off mode is made upon the completion of execution of the function.

Further, some preferred embodiments of the present invention are described in the following referring to the drawings.

FIG. 1 is a block diagram showing the configuration of an image forming apparatus 10 according to a preferred embodiment of the present invention. The image forming apparatus 10 is an apparatus called as a multifunctional peripheral provided with functions such as the copying function of optically reading out an original document and printing out its copy image on a recording paper, the scanning function of storing in the form of a file or transmitting to an external terminal the image data of a document that has been read out, the PC printer function of forming and outputting on a recoding sheet the images related to a print job received from an external terminal such as personal computer, the facsimile function of transmitting and receiving image data.

The image forming apparatus 10 is configured by connecting a ROM (Read Only Memory) 13, a RAM (Random Access Memory) 14, a nonvolatile memory 15, an certification section 16, an operation display section 17, a facsimile communication section 18, a network communication section 19, a hard disk device 20, an image processing section 21, a scanner section 22, and a printer section 23 via a bus 12 to a CPU (Central Processing Unit) 11 as a control section that comprehensively controls the operations of this image forming apparatus 10. Further, a power supply section 25 is provided that controls the power supply to the different sections of the image forming apparatus 10 based on the power supply control signal 24 from the CPU 11.

Various types of programs are stored in the ROM 13 and the different functions as an image forming apparatus 10 are realized by the CPU 11 executing processing based on these programs. The RAM 14 is a random access memory that is used as a working memory that temporarily stores various types of data at the time the CPU 11 is executing programs, an image memory storing image data or a communication buffer that temporarily stores data related to the transmission and reception or the like.

The nonvolatile memory 15 is a rewritable memory whose stored contents are retained even when the power supply to it has been switched off. The contents of various types of settings (set values) set for the image forming apparatus 10, user information, user certification information or the like are stored in the nonvolatile memory 15.

The certification section 16 carries out certification of users using the image forming apparatus 10. Here, communication is made with a wireless card for personal certification possessed by a user near the image forming apparatus 10, user information is read out from that card, and the user is identified and certified. The method of certification need not be restricted to this.

The operation display section 17 carries out the function of displaying various types of operation screens, setting screens, guidance screens, warning screens or the like, and the function of receiving various types of operations from the user. The operation display section 17 is configured by providing it with a display section 26 constituted using a liquid crystal display (LCD) or the like, a touch panel 27 that is provided on top of its surface and that detects the coordinates position which has been pressed, function mode keys 28, ten keys, start button, and others. The functions of the image forming apparatus 10 have been broadly classified into a plurality of function modes (such as copy mode, scan mode, fax mode), the function mode keys 28 are provided for each of these broadly classified function modes, and are used for receiving the selection of the function modes.

The facsimile communication section 18 carries out communication Control for facsimile transmission or facsimile reception, call generation (dialing), call reception, connection with the telephone lines, and others. When the facsimile communication section 18 detects an incoming call, it has the function of notifying the CPU 11 of this.

The network communication section 19 carries out the function of communicating with terminal equipment such as personal computers or servers connected via a network such as a LAN, and of transmitting and receiving various types of data or information.

The hard disk device 20 is a large capacity nonvolatile storage device, and stores image data or the like. In the hard disk device 20, boxes are prepared which are storage areas that are managed for each user or for each group. Image data or the like are stored in the boxes.

The image processing section 21 is provided with functions that carry out rasterizing processing of converting the print data received from and external terminal equipment into image data (bit map data), compression processing, decompression processing of image data, image rotation processing and others.

The scanner section 22 carries out the function of obtaining the image data by optically reading out an original document. The scanner section 22 is configured to be provided with, for example, a light source that emits light onto an original document, a line image sensor that receives the light reflected from the document and reads out one line part of the document in the width direction, a movement device that successively moves the reading position in units of a line along the length direction of the document, an optical path that is made of lenses, mirrors and others, and that guides the light reflected from the document to the image sensor and forms an image, and a conversion section that converts the analog image signal outputted by the line image sensor into digital image data.

In addition, the scanner section 22 is provided with an automatic document feeder equipment not shown in the figure. The automatic document feeder equipment has the function of successively issuing and conveying the topmost sheet from a stack of document sheets placed on the document table, passing it through the prescribed reading out position at which the line image sensor of the scanning section 22 reads out the image of the original document, and discharging the document sheet. The scanner section 22 is capable of ADF reading in which this automatic document feeder equipment is used and a plurality of sheets of the original document is read out successively, and the platen reading in which on sheet of document placed stationarily on a platen glass is read out.

The printer section 23 carries out the function of printing out the images on a recording sheet according to the image data. Here, this section is configured to have a conveying unit for recording sheets, a photoreceptor drum, a charging unit, a laser unit, a developing unit, a transfer unit, a separating unit, a cleaning unit, and a fixing unit 29, as a so called laser printer carrying out image formation using an electro-photographic process.

In detailed terms, the surface of a rotating cylindrical shaped photoreceptor drum is charged uniformly by a charging unit that generates corona discharge, and the surface of this uniformly charged photoreceptor drum is impinged by a laser beam of light generated by the laser unit thereby forming an electrostatic latent image. The developing unit converts the electrostatic latent image formed on the surface of the photoreceptor drum into an apparent toner image, and this toner image is transferred by the transfer unit electrostatically onto a recording sheet that is issued from a sheet tray and conveyed by the conveying unit. The recording sheet with a toner image transferred onto it is separated from the photoreceptor drum due to discharging by the separating unit, conveyed further, and is discharged after passing through the fixing unit 29. The fixing unit 29 has the function of fixing the toner image on the recording sheet to the recording sheet by the application of heat and pressure. The cleaning unit removes and recovers the toner remaining on the photoreceptor drum after transferring by scraping with a blade or the like. The power consumption of the fixing unit 29 is large.

The power supply section 25 has the function of generating DC voltages derived from commercial AC power supply, and carrying out supply of DC power selectively to the different sections of the image forming apparatus 10. Here, the power supply section 25 has the power output A, the power output B, and the power output C, and is provided with the function of individually controlling the supplying of power and the stopping of the power supply of the power outputs A, B, and C in accordance with the power control signal 24 that is inputted from the CPU 11. The power output A provides the electric power for enabling the system control section having the CPU 11 and for enabling the functions of the function mode keys 28. The power output B supplies electric power to the display section 26 and the touch panel 27. The power output C supplies electric power to the scanner section 22 and the printer section 23.

FIG. 2 is a power supply modes list 40 showing the power supply modes used in an image forming apparatus 10 and the power supply locations in each of the power supply modes. The power supply modes are the normal mode, the energy saving mode in which the power consumption is smaller than in the normal mode, and the off mode in which the power consumption is smaller than in the energy saving mode.

The off mode is a power supply mode in which electric power is supplied only from the power output A and the supply of power has been stopped from the power output B and the power output C. The energy saving mode is a power supply mode in which electric power is supplied only from the power output A and the power output B, and the supply of power has been stopped from the power output C. The normal mode is a power supply mode in which electric power is supplied from all of the power outputs A, B, and C.

In the normal mode, since electric power is supplied to all sections of the image forming apparatus 10, it is possible to use all the functions of the image forming apparatus 10.

In the energy saving mode, since the electric power supply from the power output C is stopped, although it is not possible to use the functions that use the scanner section 22 and the printer section 23 both of which receive power supply from the power output C, it is possible to use other functions, for example, the box transmission function of transmitting the image data stored in the box to an external apparatus.

Further, it is possible to set suitably to which parts the electric power is to be supplied and to which parts the electric power supply has to be stopped in the energy saving mode. For example, the configuration can also be made so as to supply power to the scanner section 22 in the energy saving mode. In the energy saving mode, it is desirable to stop the supply of electric power to parts of large power consumption, such as the fixing unit 29.

In the off mode, only the system control section and the function mode keys 28 that receive power from the power output A is operating. Therefore, there is no display of the operation screens in the display section 26. In the off mode, events that become triggers for transferring to other power supply modes are detected, such as detection of reception of a facsimile, reception of data from an external terminal via the network communication section 19, operation of the function mode keys 28, or the like.

Further, in the off mode, power can also be supplied only to the parts that detect the above events. For example, it is also possible to input the operation detection signal of the function mode keys 28, the incoming call detection signal or the like as an interrupt signal to the CPU 11, and to make the CPU 11 operate in the energy saving mode only to accept the interrupts, and to stop the supply of power to all other sections.

FIG. 3 shows the functions belonging to each of the functional modes of the image forming apparatus 10 while classifying them into functions that can be used in the energy saving mode and the functions that can be used in the normal mode. In the figure, the functions marked with an asterisk (*) are the functions that cannot be used in the energy saving mode but can only be used in the normal mode. The functional modes include the copy mode, the scan mode, the fax mode, the box mode, the PC print mode and the utility mode.

For example, in the copy mode, when the power supply mode is the normal mode, the history display function and the copying function can be used, but in the energy saving mode, the copying function cannot be used but only the history display function can be used. Here, the history display function is the function of displaying the execution history of jobs in the display section 26. In the fax mode, when the power supply mode is the normal mode, the fax transmission function that uses the scanner section 22, the fax transmission and reception (accumulation) function that uses a memory, and the history display function can be used. However in the energy saving mode, only the fax transmission and reception (accumulation) function that uses the memory and the history display function can be used. The other functions can be referred in the diagram and their explanations are omitted here.

Figure 4:
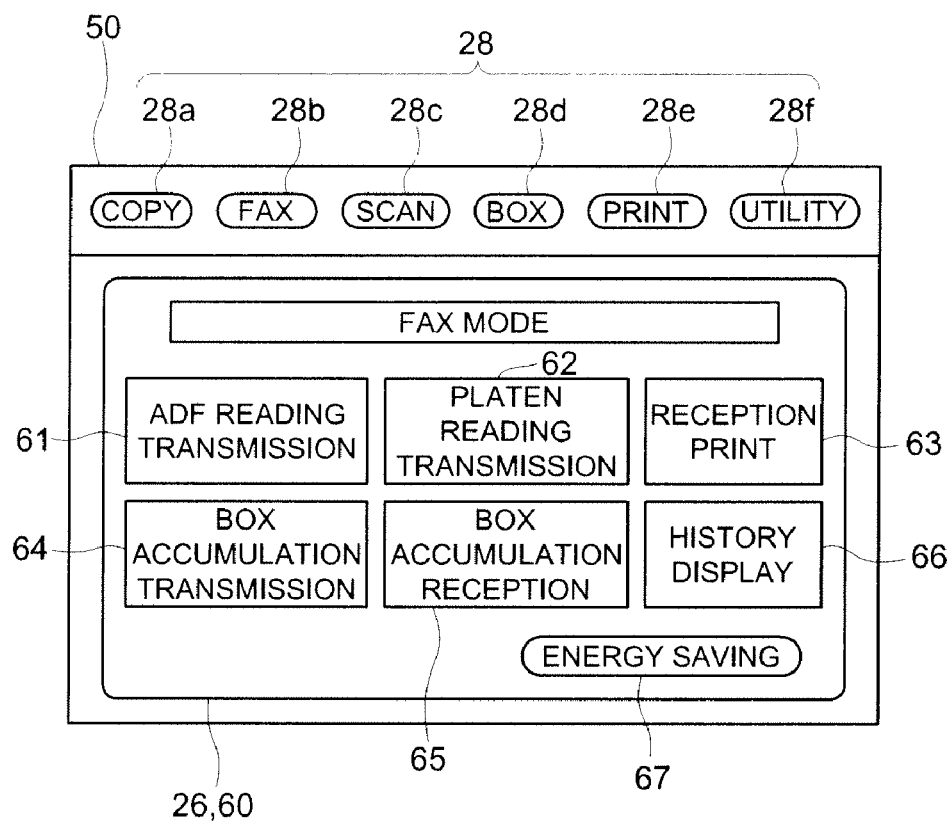
FIG. 4 is a front view diagram showing an example of an operation panel as an operation display section.

FIG. 4 is a front view diagram showing an example of an operation panel 50 as an operation display section 17. The operation panel 50 is provided with display screen of a liquid crystal display which is the display section 26, and above it, function mode keys 28 which are configured as hard keys are arranged. The function mode keys 28 are switches having mechanical contacts. The function mode keys 28 are provided for each function mode and are configured to have a copy mode key 28a used for the selection operation of the copy mode, the fax mode key 28b used for the selection operation of the fax mode, the scan mode key 28c for the selection operation of the scan mode, the box mode key 28d for the selection operation of the box mode, the print mode key 28e for the selection operation of the print mode, and the utility mode key 28f for the selection operation of the utility mode.

Figure 5:
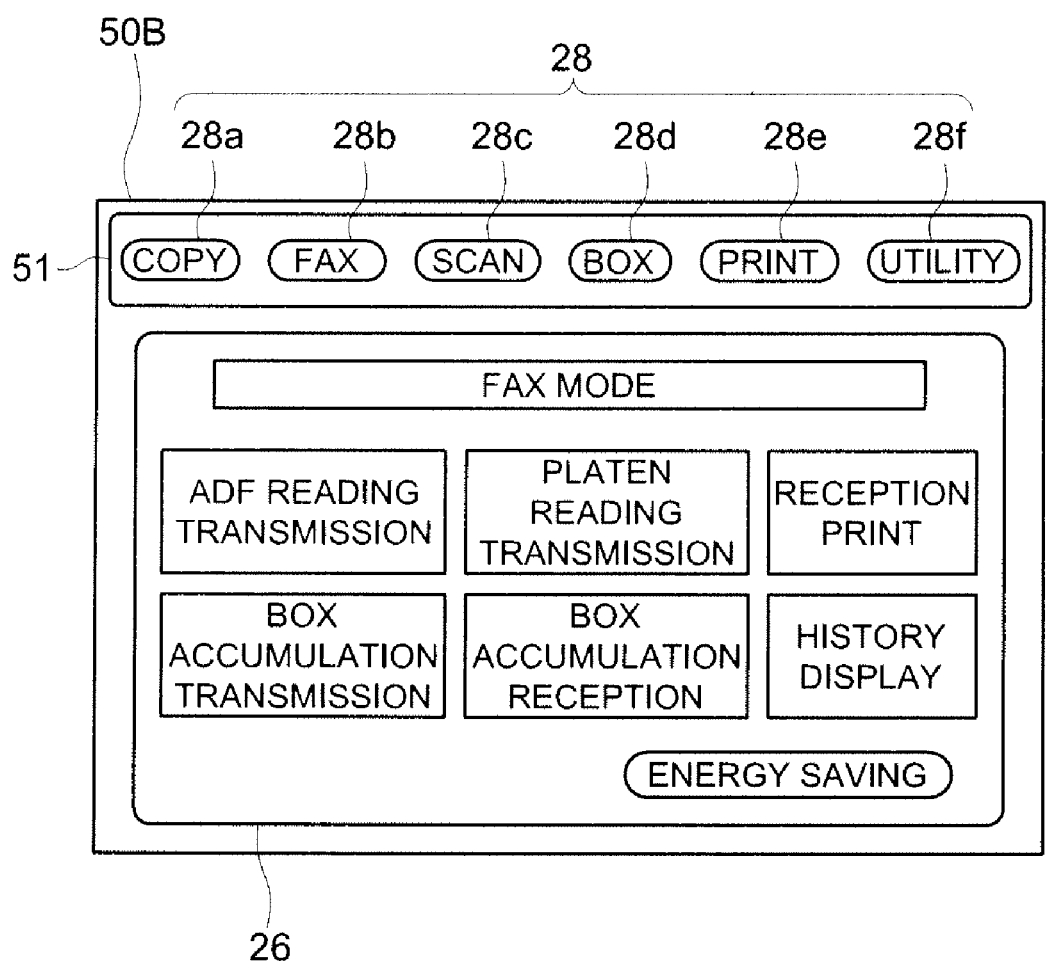
FIG. 5 is a front view diagram showing an operation panel when the function mode keys are made soft keys.

The function mode keys need not only be configured as hard keys, but can also be configured as soft keys. A soft key is an operation key that is displayed in the display screen, and key depressing operation of it is detected by the touch panel. FIG. 5 shows an example of an operation panel 50B when the function mode keys 28 are configured as soft keys. In the operation panel 50B, a display screen of the display section 26 and a second display section 51 for displaying the function mode keys 28 as soft keys are arranged. The second display section 51 is configured by forming a touch panel on the surface of a liquid crystal display. In the second display section 51, the function mode keys 28a to 28f as soft keys for each of the function modes are displayed. The second display section 51 and its touch panel receive power supply and function even in the off mode. In concrete terms, the second display section 51 and its touch panel receive power supply from the power output A, and the display section 26 and its touch panel 27 receive power supply from the power output B.

When any function mode key 28 is operated in the off mode, the image forming apparatus 10 transfers (recovers) to the energy saving mode. Further, the operation screen corresponding to that operated function mode key 28 is displayed in the display section 26 of the operation display section 17.

When the image forming apparatus 10 displays in the energy saving mode, the operation screen (a prescribed operation screen having the operation buttons as function icons related to functions that can be used only in the energy saving mode), the operation buttons (function icons) corresponding to the functions that can be used in the energy saving mode are displayed in a form that is different from a form of the operation buttons (function icons) corresponding to the functions that can be used only in the normal mode. In other words, in the operation screen displayed in the operation display section 17 in the energy saving mode, the operation buttons related to the functions that can be used in the energy saving mode without having to transfer to the normal mode are displayed in a form different from that of the operation buttons related to the functions that cannot be used unless the mode transfers to the normal mode.

In the display section 26 of the operation panel 50 shown in FIG. 4, is shown the operation screen (normal mode operation screen 60) corresponding to the fax mode displayed in the state in which the power supply mode is the normal mode. The functions of the fax mode that can be used in the normal mode are the ADF reading transmission mode of reading the original document by ADF reading and carrying out its facsimile transmission, the platen reading transmission mode of reading the original document placed on the platen glass and carrying out facsimile transmission, the reception print function of printing in the printer section 23 the image received by fax reception, the box accumulation transmission function of transmitting images stored in the box, the box accumulation reception function of storing in the box the image data received from an external source, and the history display function. In the normal mode operation screen 60 of the fax mode, the operation buttons 61 to 66 for selecting these functions as function icons corresponding to each of these functions and the energy saving key 67 for transferring to the energy saving mode are displayed. In this manner, in the state in which the power supply mode is the normal mode, the operation buttons (selection buttons) of all the functions belonging to the function mode selected by the function mode key 28 are displayed in the operation screen.

Two forms of display have been prepared for the operation screen displayed when the power supply mode is the energy saving mode. One is the limited display format in which the operation buttons related to the functions that cannot be used in the energy saving mode (the functions that can be used only in the normal mode) are not displayed. The other is the color-coded display format in which the operation buttons related to the functions that cannot be used in the energy saving mode and the operation buttons related to the functions that can be used in the energy saving mode are displayed in different colors. Whether to use the limited display format or the color-coded display format is set in advance by the manager, and that set value is stored in the nonvolatile memory 15. The setting operation for this set value is made using a prescribed manager screen from the operation display section 17, or is made from an external terminal via a network.

Figure 6A:
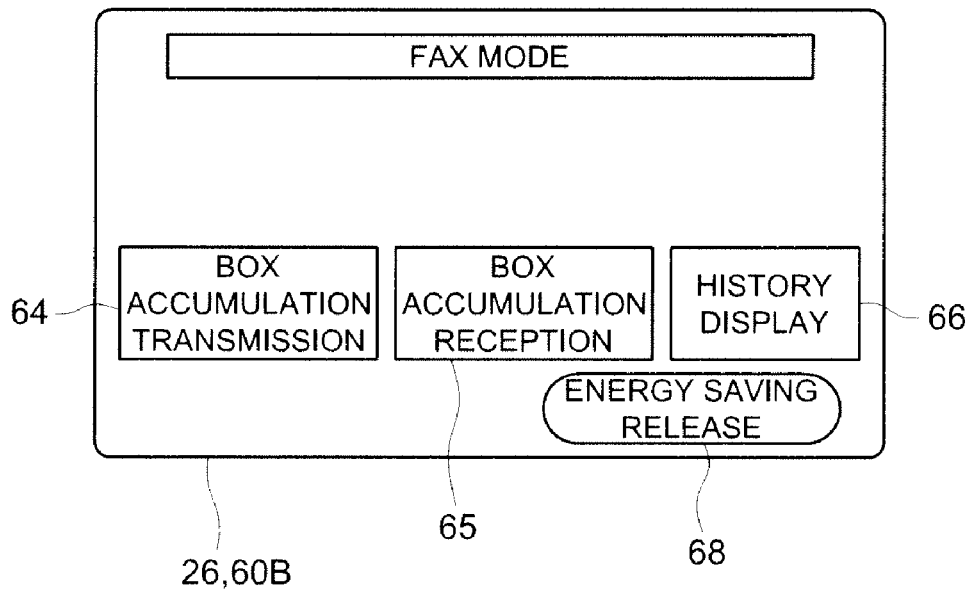
FIGS. 6a and 6b are front view diagrams showing examples related to the limited display format and the color-coded display format of the operation screen of the fax mode displayed when the power supply mode is in the energy saving mode.
Figure 6B:
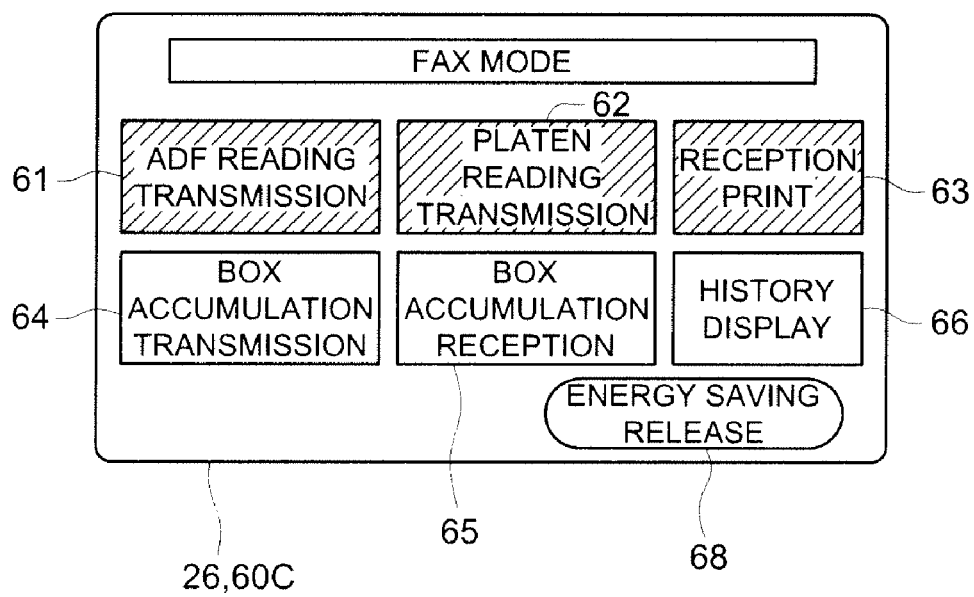

Each of FIGS. 6a and 6b shows the operation screen of the fax mode displayed when the power supply mode is the energy saving mode. FIG. 6a is an operation screen 60B of the limited display format, and FIG. 6b is the operation screen 60C of the color-coded format.

The functions of the fax mode that can be used in the energy saving mode are the box accumulation transmission function, the box accumulation reception function, and the history display function, while the ADF reading transmission function, the platen reading transmission function, and the reception and print function cannot be used. Because of this, in the operation screen 60B of the limited display format shown in FIG. 6a, the operation buttons 64 to 66 corresponding to the box accumulation transmission function, the box accumulation reception function, and the history display function have been displayed, and the operation buttons 61 to 63 corresponding to the ADF reading transmission function, the platen reading transmission function, and the reception print function that have been displayed in the fax mode normal operation screen 60 of FIG. 4 have not been displayed.

Further, in the operation screen 60C of the color-coded format shown in FIG. 6b, the operation buttons 64 to 66 corresponding to the box accumulation transmission function, the box accumulation reception function, and the history display function that can be used in the energy saving mode have been displayed in a color different from the color of the operation buttons 61 to 63 corresponding to the ADF reading transmission function, the platen reading transmission function, and the reception print function that cannot be used in the energy saving mode. Further, in both the operation screen 60B of the limited display format and in the operation screen 60C of the color-coded format, an energy saving release key 68 has been displayed for switching the power supply mode to the normal mode.

When the energy saving release key 58 is pressed in either the operation screen 608 of the limited display format or the operation screen 60C of the color-coded format, not only the power supply mode is changed from the energy saving mode to the normal mode, but also the display in the display section 26 of the operation display section 17 transits to the normal mode operation screen 60 shown in FIG. 4. Again, when the energy saving key 67 is pressed in the normal mode operation screen 60, not only the power supply mode is changed from the normal mode to the energy saving mode, but also the display in the display section 26 of the operation display section 17 changes to the operation screen 60B of the limited display format or the operation screen 60C of the color-coded format.

Figure 7A:
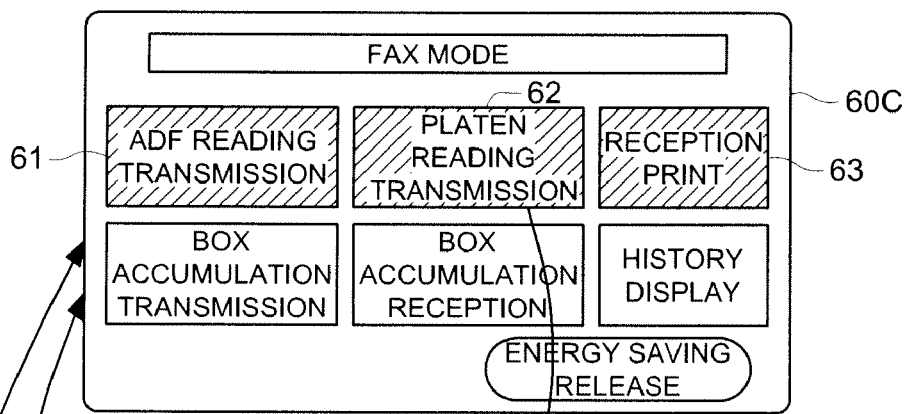
FIGS. 7a, 7b, and 7c are explanatory diagrams showing the warning screens displayed when the selection operation is made of an operation button related to a function that cannot be used in the energy saving mode in the operation screen of the color-coded format.
Figure 7B:
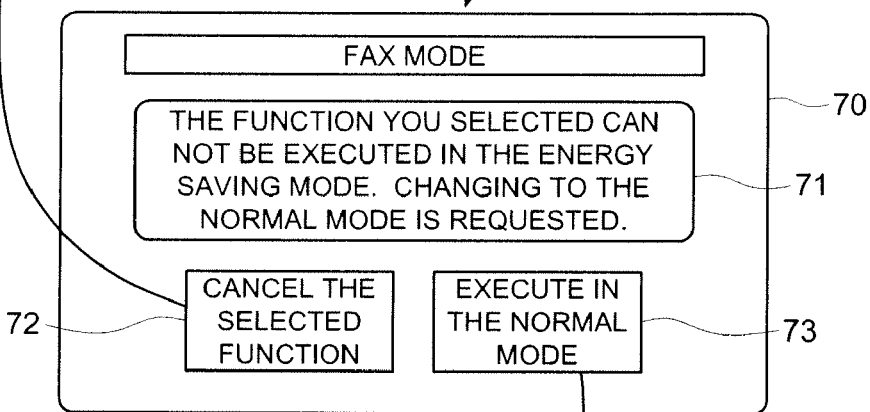
Figure 7C:
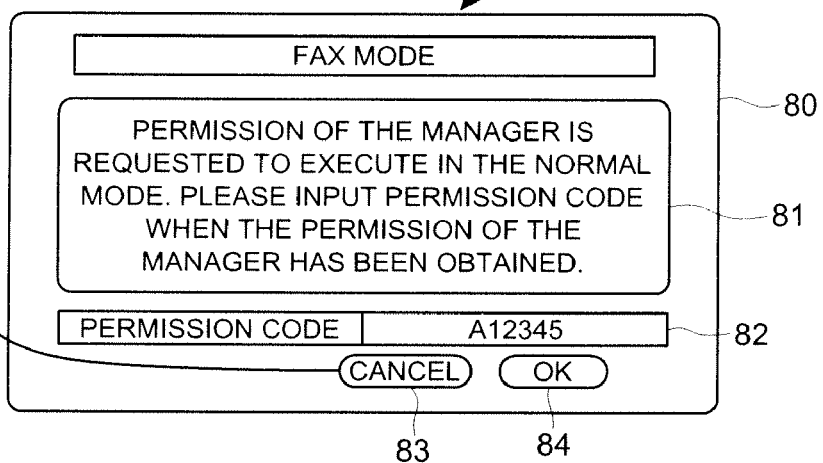

FIGS. 7a, 7b and 7c show the warning screens 70 and others, displayed when the selection operation is made of an operation button related to a function that cannot be used in the energy saving mode in the operation screen 60C of the color-coded format. For example, when the operation button 62 corresponding to the platen reading transmission function is operated in the operation screen 60C of the color-coded format shown in FIG. 7a, the warning screen 70 shown in FIG. 7b is displayed in the display section 26 of the operation display section 17. In the warning screen 70, a warning message indicating that the function corresponding to the button 62 that was operated is a function that requires transferring to the normal mode, a cancel button 72, and an execution button 73 are displayed.

If the cancel button 72 is pressed, the CPU 11 of the image forming apparatus 10 cancels the function that had been selected on the operation screen 60C of the color-coded format, and returns to the display of the operation screen 60C of the color-coded format.

If the execution button 73 is pressed, a permission screen 80 such as the one shown in FIG. 7c is displayed in the display section 26 of the operation display section 17. In the permission screen 80, a guidance message 81 informing the user that permission from the manager is required for executing that function by transferring to the normal mode or, if the manager's permission has been obtained, a message prompting the user that the permission code has to be inputted, an input field 82 for entering the permission code, a cancel button 83, and an OK button 84 are displayed.

The permission code is the information that proves the permission from the manager and is obtained by the user in advance by making an application to the manager. The permission codes issued by the manager are registered in the image forming apparatus 10, for example, in the nonvolatile memory 15. When the OK button 84 is pressed in the condition in which the permission code has been entered in the input field 82, the CPU 11 of the image forming apparatus 10 compares the entered permission code with the registered permission codes. If the two match, the mode is changed to the normal mode and the function selected by the user in the operation screen 60C of the color-coded format is executed. If the cancel button 83 is pressed, the CPU 11 of the image forming apparatus 10 cancels the function selected in the operation screen 60C of the color-coded format and returns to the operation screen 60C of the color-coded format.

However, the operation when the execution button 73 is pressed in the warning screen 70 need not be restricted to the above. For example, it is possible to have a configuration in which that function is executed after taking actions such as reporting by email or the like, to the manager that the function has been executed after changing to the normal mode along with reporting that user name, or recording an execution history showing that the function was executed after changing to the normal mode while establishing correspondence with the user name.

FIG. 8 shows the flow of processing carried out by the image forming apparatus 10 related to changes in the power supply mode and display of operation screens. This processing is executed repetitively. The CPU 11 of the image forming apparatus 10 judges whether the current power supply mode is the normal mode or not (Step S101). If it is not the normal mode (NO in Step S101), a judgment is made as to whether the user operating that image forming apparatus 10 has been detected or not (Step S102). For example, the operating user is considered to be detected if the personal certification wireless card possessed by the user is being detected by the certification section 16. If the operating user is not detected (NO in Step S102), the power supply mode is changed to the off mode (Step S109). Due to changing to the off mode, the power supply to the display section 26 is stopped and the display goes off (no display).

When the operating user has been detected (YES in Step S102), a judgment is made as to whether or not a function mode key 28 has been pressed (Step S104), and if a key has not been pressed (NO in Step S104), the operation is transferred to Step S109.

When any function mode key 28 has been pressed (YES in Step S104), the power supply mode is changed to the energy saving mode, or else, if the current energy supply mode is the energy saving mode, then the energy saving mode is maintained as it is. Next, the operation screen corresponding to the function mode corresponding to the pressed function mode key 28 is displayed in the energy saving mode (Step S105).

Figure 9:
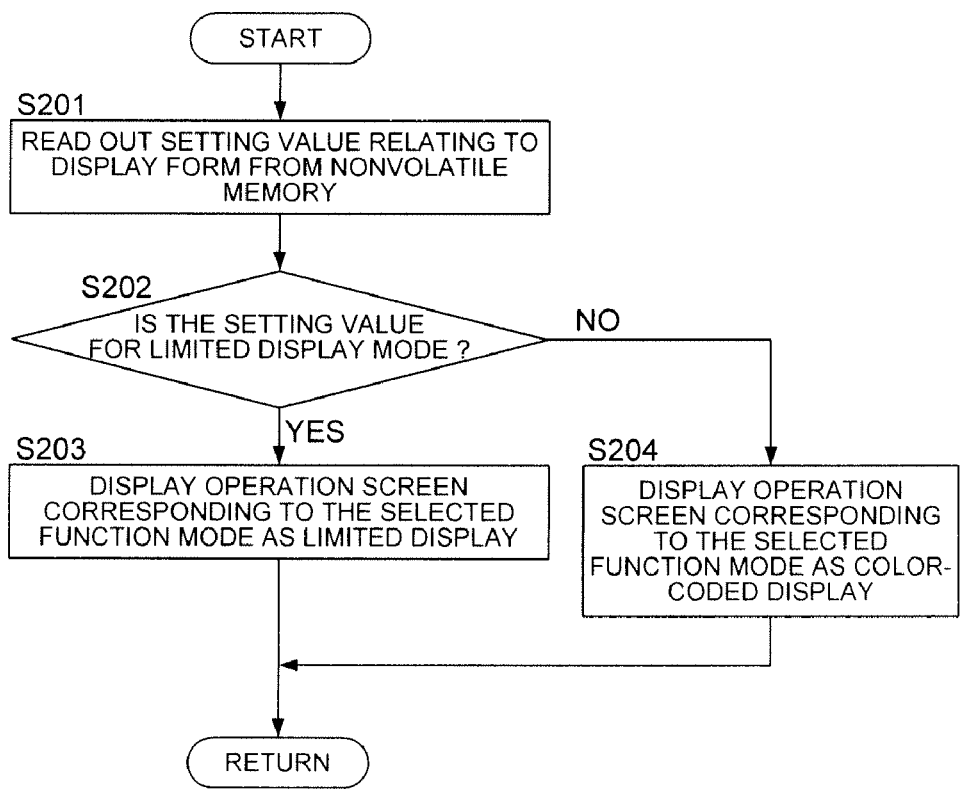
FIG. 9 is a flow chart showing the display processing of the operation screen in the energy saving mode.

FIG. 9 shows the details of the processing of Step S105. To begin with, the set value related to the display format is read out from the nonvolatile memory 15 (Step S201), and a judgment is made as to whether the set value corresponds to limited display format or to color-coded format (Step S202). If that value corresponds to limited display format (YES in Step S202), the operation screen corresponding to the function mode selected by the function mode key 28 is displayed in the limited display format as is shown in FIG. 6a (Step S203). On the other hand, if the value corresponds to color-coded format (NO in Step S202), the operation screen corresponding to the selected function mode is displayed in the color-coded format as is shown in FIG. 6b (Step S204).

The explanations are continued returning to FIG. 8. When the energy saving release key 68 is pressed in the operation screen displayed in Step S105 in the energy saving mode (YES in Step S106), not only the power supply mode is changed to the normal mode but also the display of the operation screen is changed to the display of normal mode (Step S114).

When the energy saving release key 68 has not been pressed (NO in Step S106) and there is no operation (NO in Step S107), this processing is ended. Further, if the selection operation is received of an operation button related to a function that can be used in the energy saving mode (NO in Step S107), that function is executed. On the other hand, when an operation screen 60C in the color-coded format is being displayed, if a selection operation of a function that requires the transfer to the normal mode is received (YES in Step S107), a warning display processing is executed (Step S108).

Figure 10:
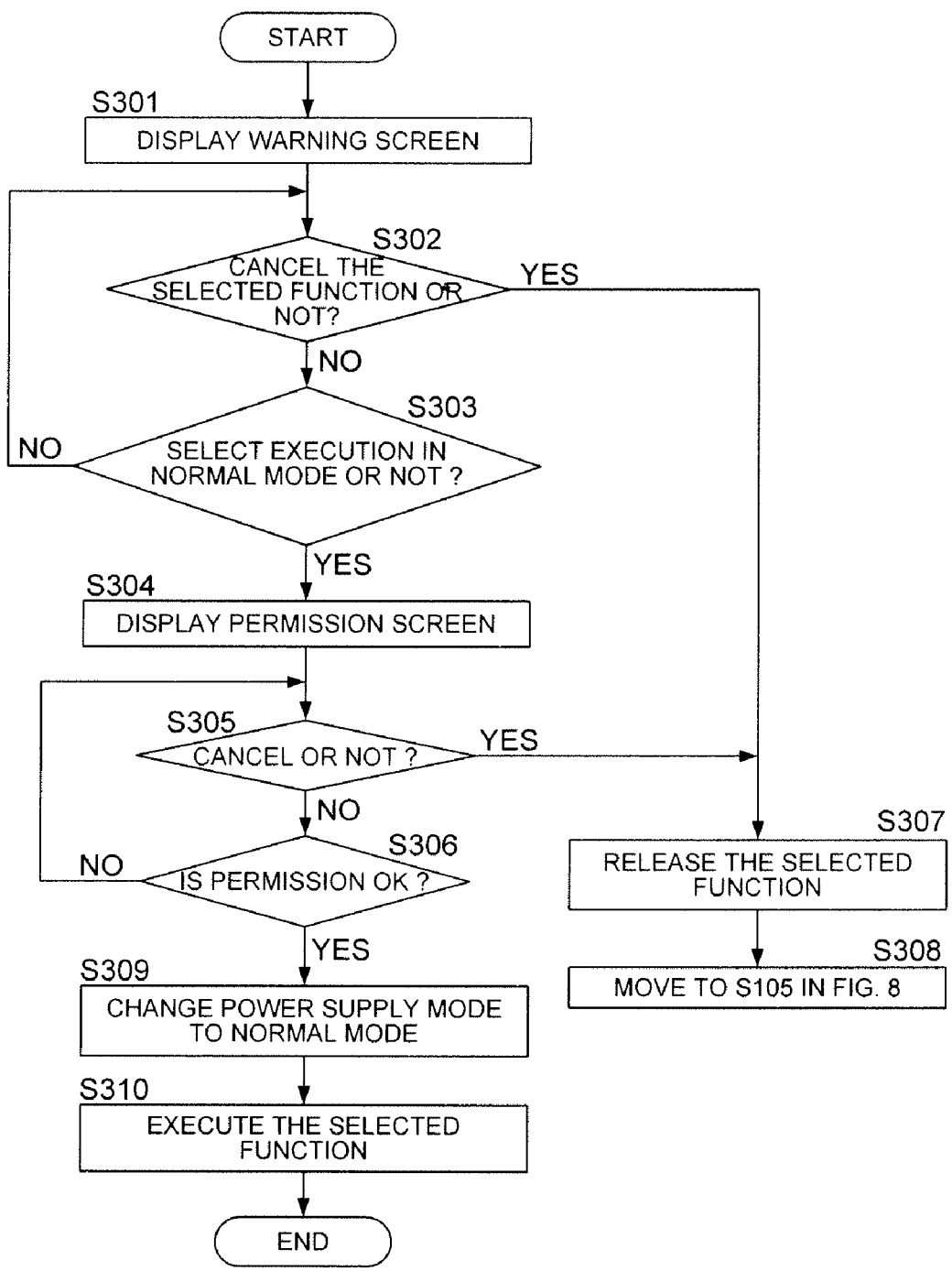
FIG. 10 is a flow chart showing the warning display processing.

FIG. 10 shows the flow of the warning display processing. To begin with, a warning screen 70 such as that shown in FIG. 7b is displayed in the display section 26 of the operation display section 17 (Step S301). Here, if the pressing operation of the cancel button 72 is received (YES in Step S302), the selection state of the function whose selection was received in the operation screen 60C of the color-coded format is released (Step S307), and the operation moves to Step S105 (display of operation screen in the energy saving mode) of FIG. 8 (Steps S308).

When the pressing operation of the execution button 73 is received in the warning screen 70 (YES in Step S303), the permission screen 80 is displayed (Step S304). If the pressing operation of the cancel button 83 is received in the permission screen 80 (YES in Step S305), the selection state of the function whose selection was received in the operation screen of the color-coded format is released (Step S307), and the operation moves to Step S105 (display of operation screen in the energy saving mode) of FIG. 8 (Steps S308).

When the pressing operation of the OK button 84 is received after a proper permission code has been inputted in the permission screen 80 (YES in Step S306), the power supply mode is changed to the normal mode (Step S309), and the function whose selection was received in the operation screen 60C of the color-coded format is executed (Step S310).

The explanations are continued returning to FIG. 8. While the current power supply mode is the normal mode (YES in Step S101), if the energy saving key 67 is pressed in the normal mode operation screen 60 (YES in Step S103), the operation moves to Step S105. In other words, the operation screen corresponding to the same function mode as one in which the operation screen was being displayed in the normal mode is displayed in the display format of the energy saving mode.

When any function mode key 28 is pressed in the state in which the operation screen is being displayed in the normal mode (YES in Step S110), the operation screen of the function mode corresponding to that pressed function mode key 28 is displayed in the display format of the normal mode (Step S114). If any operation button of any function mode is pressed on this operation screen, that function is executed.

In the normal mode, when a prescribed time has elapsed after receiving the last operation (YES in Step S111), the power supply mode is changed to the off mode (Step S112). Because of changing to the off mode, the power supply to all sections other than the system control section will be stopped, and even the power supply to the display section 26 is stopped and hence the display becomes off.

When a prescribed time has not elapsed after receiving the last operation (NO in Step S111), the display status of the current display screen is maintained (Step S113).

In this manner, in the image forming apparatus 10, since an energy saving mode has been provided in between the normal mode and the off mode, it is possible to execute the jobs related to the functions that can be used in the energy saving mode in the condition in which the power consumption is suppressed without having to start the fixing section 29, or the like.

Further, when displaying operation screens in the energy saving mode, the operation buttons related to the functions that can be used in the energy saving mode are displayed in a form different from that of the operation buttons related to the functions that can be used only in the normal mode. Because of this, it is possible to make the user recognize the functions that can be used in the energy saving mode as being distinct from the functions that need changing over to the normal mode, and to prompt the user to select the functions that can be executed in the state of the energy saving mode before changing over to the normal mode.

In particular, in the case in which the operation screen is displayed in the limited display format, since the operation buttons have not been displayed for the functions that require changing over to the normal mode, the actions of users selecting those functions can be effectively suppressed.

In addition, in the operation screen in the color-coded format, since a warning screen 70 is displayed when the selection is received of an operation button related to a function that requires changing over to the normal mode, it is possible to make the user hesitate to execute that function by taking the trouble of changing to the normal mode, and to suppress such executions. Further, when the selection operation of a function requiring the changing over to the normal mode is made by mistake, it is possible to make the user recognize the wrong operation through the warning screen 70 before changing over to the normal mode, and to make the user recognize the wrong operation and correct it.

Furthermore, since permission by the manager is made necessary at the time of executing functions that require changing over to the normal mode or information is sent to the manager, the manager can severely control the execution of functions requiring changing over to the normal mode, and the ordinary users can be made to become more aware of energy saving.

Further, in the image forming apparatus 10, upon the completion of the setting operation related to the functions selected in the energy saving mode, or upon the completion of execution of a function selected in the energy saving mode, the display in the display section 26 is being switched off. In this manner, by switching off the display that is not necessary, still greater energy saving is being aimed at.

FIG. 11*a* shows a display screen 90 in the condition, in which, in the energy saving mode, a selection of a function that can be used in the energy saving mode has been received (in this case, the selection of the box accumulation transmission function), the setting operation related to that function has been received, and the pressing of the Start button is being awaited as a confirmation operation of completion of settings. When the pressing of the Start button is received in this condition, the setting becomes completed, the image forming apparatus 10, as shown in the display screen 91 of FIG. 11*b*, displays a message in the display section 26 that that display section 26 will become switched off, and after that, turns off the display of the display section 26. The switching off of the display is made by turning off the power supply to the display section 26. Here, the power supply mode is changed from the energy saving mode to the off mode.

Figure 12A:
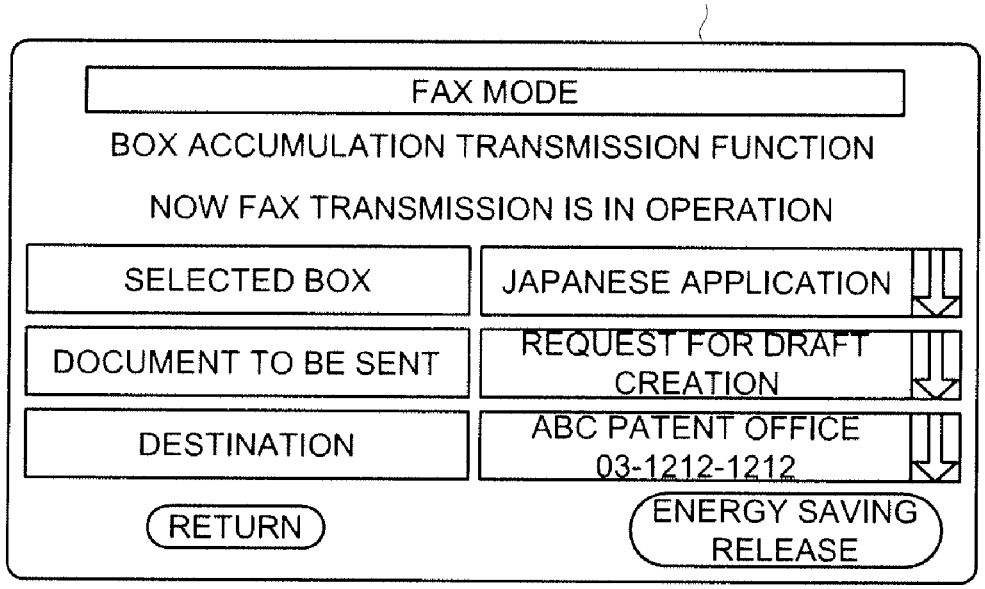
FIGS. 12a and 12b are front view diagrams showing examples of the display screen during execution and after completion of execution of a function selected in the energy saving mode.
Figure 12B:
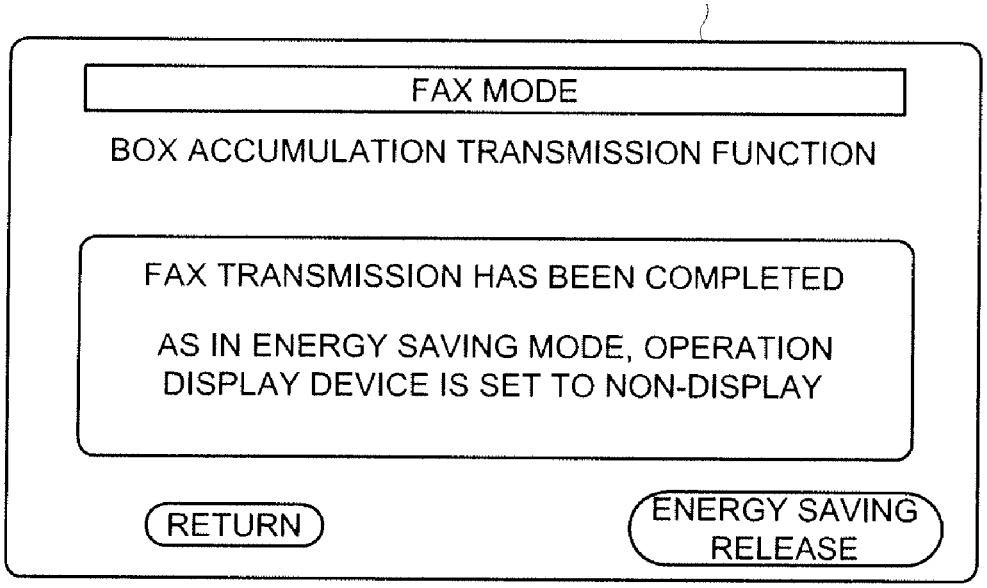

FIG. 12*a* shows a display screen 92 in the energy saving mode indicating that a function that can be used in the energy saving mode is being executed (in this case, the box accumulation transmission function). When the execution of the selected function is completed in the energy saving mode, the image forming apparatus 10, as shown in the display screen 93 of FIG. 12*b*, displays a message in the display section 26 that display section 26 will become switched off, and after that, turns off the display of the display section 26. The switching off of the display is made by turning off the power supply to the display section 26. Here, the power supply mode is changed from the energy saving mode to the off mode.

However, it is sufficient that the display is turned off upon the completion of the setting operation or the completion of execution, and it is possible to switch off the display immediately after the completion of the setting operation or the completion of execution, or to turn off the display when a prescribed time period has elapsed after completion. This prescribed period of time is made a shorter period of time than the prescribed period of time of Step S111 of FIG. 8.

Although some preferred embodiments of the present invention were described above with reference to the drawings, the concrete configuration is not construed to be restricted to those shown in the preferred embodiments, and any modifications or additions made without deviating from the scope and intent of the present invention shall be considered to be within the present invention.

Further, although, in the preferred embodiments, the configuration was one in which a touch panel 27 was provided in the operation display section 17, and the selection operation of the functions corresponding to each of the operation buttons 61 to 66 was received by the pressing of the displayed operation buttons 61 to 66, it is also possible to have a configuration in which a touch panel is not provided. In other words, it is possible to have a configuration in which, instead of the operation buttons 61 to 66, function icons that indicate the details of functions by characters or graphic patterns are displayed, and the selection operation of the function corresponding to each function icon is received by separate operation keys such as number keys, arrow keys.

In the preferred embodiments, although explanations were given taking the example of an image forming apparatus 10 having an operation display device (operation display section 17 and its control section (CPU 11 or the like)), the apparatus provided with the operation display device need not be restricted to an image forming apparatus. The apparatus can be any apparatus as long as it has a plurality of power supply modes with different power consumptions such as the normal mode and the energy saving mode, and has functions that can be used in the energy saving mode and the functions that can be used only in the normal mode.

Further, it is possible that the off mode is not present as a power supply mode. In addition, although the display of different operation screens was made for different function modes in the preferred embodiments, the configuration can be one that makes no such distinction for different function modes. For example, when the number of functions possessed by the apparatus is relatively small, it is not necessary to classify those functions into different function modes. In other words, it is sufficient to display the operation buttons for all the functions in the normal mode, and to display the operation buttons related to the functions that can be used in the energy saving mode among all the functions while enabling distinguishing them from the operation buttons related to the functions that can be used only in the normal mode. In this case, the instead of the function mode key 28, a single recover button is provided, and the mode is changed from the off mode to the energy saving mode when that recover button is pressed. Or else, it is also possible to have a configuration in which the changing to the energy saving mode is made upon detection of an operating user.

Further, regarding a screen that does not have any operation buttons related to functions that can be used in the energy saving mode, it is possible to make the display format in the energy saving made identical to the display format in the normal mode, or else they can be made different.

As described above, according to an operation display device and an image forming apparatus provided therewith, at the time of selecting functions in the energy saving state, it is possible to prompt the user to select low power consumption functions.

What is claimed is:

1. An operation display device which is provided in an apparatus and which displays function icons and receives selection operation of a function among functions corresponding to the function icons, wherein a power supply mode in the apparatus changes between a normal mode and an energy saving mode, power consumption in the energy saving mode being smaller than power consumption in the normal mode, and wherein a function which can be used in the normal mode and a function which can be used in the energy saving mode are set in advance, and the operation display device comprises:

a control section which displays a function icon related to a function which can be used in the energy saving mode in a form different from a form of a function icon related to a function which can be used only in the normal mode when displaying, in a state of the energy saving mode, a prescribed screen including the function icon related to the function which can be used in the energy saving mode.

2. The operation display device of claim 1,
wherein the apparatus has further an off mode in which power consumption is smaller than power consumption in the energy saving mode as an option of the power supply mode, and is configured so that the power supply mode is changed from the off mode to the energy saving mode when a selection operation for selecting a function type among function types is received in a state of the off mode, the function types having been prepared by classifying functions which can be used in the apparatus to a plurality of types, and
wherein the control section displays a screen corresponding to the function type which has been selected by the selection operation, as the prescribed screen which is displayed in the state of the energy saving mode to which the power supply mode has been changed upon receiving the selection operation for selecting the function type in the state of the off mode.

3. The operation display device of claim 1,
wherein the control section carries out a prescribed warning display when the selection operation of a function corresponding to the function icon related to the function which can be used only in the normal mode, is received in the state of the energy saving mode.

4. The operation display device of claim 1,
wherein when displaying the prescribed screen in the state of the energy saving mode, the control section displays the function icon related to the function which can be used in the energy saving mode, and does not display the function icon related to the function which can be used only in the normal mode.

5. The operation display device of claim 1,
wherein the function icon functions as an operation button which selects a function corresponding to the function icon.

6. The operation display device of claim 1,
wherein in the energy saving mode, the control section makes display of a screen by the operation display device off upon completion of operation setting related to a selected function.

7. The operation display device of claim 1,
wherein in the energy saving mode, the control section makes display of a screen by the operation display device off upon completion of execution of a selected function.

8. An image forming apparatus in which a power supply mode changes between a normal mode and an energy saving mode, power consumption in the energy saving mode being smaller than power consumption in the normal mode, the image forming apparatus comprising:

the operation display device of claim 1.

9. The image forming apparatus of claim 8,
wherein the apparatus has further an off mode in which power consumption is smaller than power consumption in the energy saving mode as an option of the power supply mode, and is configured so that the power supply mode is changed from the off mode to the energy saving mode when a selection operation for selecting a function type among function types is received in a state of the off mode, the function types having been prepared by classifying functions which can be used in the apparatus to a plurality of types, and
wherein the control section displays a screen corresponding to the function type which has been selected by the selection operation, as the prescribed screen which is displayed in the state of the energy saving mode to which the power supply mode has been changed upon receiving the selection operation for the selecting the function type in the state of the off mode.

10. The image forming apparatus of claim 8,
wherein the control section carries out a prescribed warning display when the selection operation of a function corresponding to the function icon related to the function which can be used only in the normal mode, is received in the state of the energy saving mode.

11. The image forming apparatus of claim 8,
wherein when displaying the prescribed screen in the state of the energy saving mode, the control section displays the function icon related to the function which can be used in the energy saving mode, and does not display the function icon related to the function which can be used only in the normal mode.

12. The image forming apparatus of claim 8,
wherein the function icon functions as an operation button which selects a function corresponding to the function icon.

13. The image forming apparatus of claim 8,
wherein in the energy saving mode, the control section makes display of a screen by the operation display device off upon completion of operation setting related to a selected function.

14. The image forming apparatus of claim 8,
wherein in the energy saving mode, the control section makes display of a screen by the operation display device off upon completion of execution of a selected function.

15. The operation display device of claim 1,
wherein the control section further displays an energy saving release key for changing the power supply mode from the energy saving mode to the normal mode when displaying the prescribed screen in the state of the energy saving mode.

\* \* \* \* \*